United States Patent [19]
Coleman et al.

[11] Patent Number: 5,289,521
[45] Date of Patent: Feb. 22, 1994

[54] AUDIO/TELECOMMUNICATIONS SYSTEM TO ASSIST IN SPEECH AND COGNITIVE SKILLS DEVELOPMENT FOR THE VERBALLY HANDICAPPED

[76] Inventors: Michael J. Coleman; Patricia G. Coleman, both of 1150 Rushbrooke Dr., Oakville, Ontario, Canada, L6M 1K1

[21] Appl. No.: 848,045

[22] Filed: Mar. 9, 1992

[51] Int. Cl.$^5$ .......................................... H04M 11/00
[52] U.S. Cl. ...................................... 379/52; 379/93; 379/97; 379/98
[58] Field of Search ....................... 379/52, 93, 96, 97, 379/98, 67, 88, 89, 442, 447

[56] References Cited

U.S. PATENT DOCUMENTS

| | | | |
|---|---|---|---|
| 4,307,266 | 12/1981 | Messina | 379/52 |
| 4,379,210 | 4/1983 | Sparber | 379/52 |
| 4,438,300 | 3/1984 | Morse | 374/447 |
| 4,608,457 | 8/1986 | Fowler et al. | 379/52 |
| 4,727,567 | 2/1988 | Angelini | 379/52 |
| 4,916,941 | 1/1985 | Harmeyer | 379/442 |
| 5,081,673 | 1/1992 | Engelke et al. | 379/52 |
| 5,121,421 | 6/1992 | Alheim | 379/52 |
| 5,163,084 | 11/1992 | Kim et al. | 379/97 |

FOREIGN PATENT DOCUMENTS 2183880  6/1987  United Kingdom ................. 379/52

*Primary Examiner*—Jin F. Ng
*Assistant Examiner*—Jason Chan
*Attorney, Agent, or Firm*—Dowell & Dowell

[57] ABSTRACT

A control unit device and system is provided that allows a verbally handicapped person or normal young child to interact with a remote speech development computer system to assist in the development of verbal communications and cognitive skills. The electronic circuit of the control unit provides an interface to a standard telephone network that allows communications with the remote computer system. The remote computer system consists of a high quality speech synthesizer with a telephone interface, a personal computer, and a controlling software program that contains the speech development exercises. The control unit electronic circuit further provides audio reproduction of the synthesized voice of the remote computer, DTMF (dual tone multiple frequency) tone decoding to control output devices as commanded by the remote computer, and DTMF tone encoding to allow input devices to send signals to the program on the remote computer. The verbally handicapped person interacts with the system through two switch pads on the control unit or through an expansion switch board that interfaces to an expansion port on the control unit. The keypad on a standard DTMF telephone is used by a speech pathologist or therapist to setup and control the speech and cognitive skills development programs.

10 Claims, 4 Drawing Sheets

AUDIO/TELECOMMUNICATIONS SYSTEM TO ASSIST IN SPEECH AND COGNITIVE SKILLS DEVELOPMENT FOR THE VERBALLY HANDICAPPED

This invention relates generally to telephonic communication devices for the handicapped, and more particularly to methods and devices for speech development, verbal communications and general cognitive skills development.

BACKGROUND OF THE INVENTION

Individuals who suffer from speech, voice and cognitive disorders, most often are afflicted with other primary handicaps such as hearing impairments, visual impairments, or mental incapacities due to birth defects, disease or stroke. In addition to these handicaps there may also be associated limitations in decision processes and in motor sensory control of muscles and limbs. One or more of these handicaps can significantly hinder the normal development or capability of verbal communications. Since speech is the most common method of communications in our society, a priority should be placed on developing verbal communication skills for verbally handicapped persons, before resorting to non-verbal communication methods such as sign language.

It is important that early attention be given to the development of a verbally handicapped persons speech skills, particularly in the case of children. Failure to do so can extend the period required to learn speech skills and may even limit an individuals ability to develop verbal skills to their full potential. Learning other non-verbal methods of communication such as sign language and symbolics, although sometimes easier to learn, can cause a person to use these techniques as primary methods of communication, which can further hinder the development of verbal speech skills.

The development of verbal communication skills for those with verbal handicaps requires that an individual, usually a speech pathologist or therapist, spend long hours one-on-one with the handicapped person. During this time the therapist concentrates on verbal exercises such as basic vocalization or sound production; control of voice duration, intensity and pitch; production of vowels, consonant and diphthongs sounds; phonetic and phoneme sounds; and finally the eventual sounding of words and sentences. Other exercises used to reinforce verbalizations include associations with objects for verbal reinforcement; the pairing of motor actions with vocal activities; and choice making and turn taking. Throughout the period of this therapy the therapist must be consistent in the production of sounds, must continuously repeat sounds and exercises for reinforcement, must encourage the handicapped person for responses, must reward correct responses and provide constructive feedback for incorrect responses, and must keep the attention and interest of the verbally handicapped person. The continuous concentration and patience required by this activity can be very stressful to the therapist. This can mean that the quality and quantity of therapy provided to the handicapped person could be compromised.

To remedy the problem of providing quality instruction for language skills development, without placing extreme demands on the therapist, several computer based speech development systems have been developed for the handicapped. However, those presently existing devices that have been developed fail to entirely meet the needs of verbally handicapped persons and their therapists. The reasons for this failure include the quality of speech reproduction provided, the accessibility of the systems to a wide range of users, the emphasis placed on speech production as opposed to speech development, the limited flexibility provided to customize exercises, the dependency on computer skills and standard keyboard interfaces, and the cost.

The currently available telephonic and computer based speech systems for the verbally handicapped are primarily devices to allow a deaf or hearing impaired person to communicate with a hearing person. These systems are not designed to assist in the development of basic verbal skills for a handicapped person. Such systems include TDD's (telecommunication devices for the deaf) and symbolic communication devices. TDD's allow a deaf person and a hearing person to use a typewriter like device to send messages back and forth over a telephone line, with a speech production system often used to verbally communicate the messages sent by the deaf person. Such devices have been described in Feinson, in U.S. Pat. No. 4,754,474, Jun. 28, 1988 and James, in U.S. Pat. No. 4,650,927, Mar. 17, 1987. Symbolic communication devices likewise allow a verbally handicapped person and a hearing person to communicate with each other, with the handicapped person using a symbolic keyboard instead of the typewriter like device to create the messages. Such a device was described in Little, in U.S. Pat. No. 4,908,845, Mar. 13, 1990.

The systems available for speech development range from a simple microcomputer device with one or two words of vocabulary for simple speech development, through to dedicated computer based systems that can cost thousands of dollars. The "Speak and Spell" and the "Speak and Read" products from Texas Instruments are examples of devices for simple speech development. Although inexpensive, these devices lack the range of exercises and quality of speech required for serious speech development. The more expensive dedicated computer based systems require that the user have a dedicated computer available along with a speech production system. Examples of these systems are the "Break Through To Language" software package that uses an Apple II computer along with a Touch Window speech synthesizer, and the "First Words" software package that uses an Apple II computer along with an Echo speech synthesizer. In addition to being expensive, the number and size of hardware components used with these systems do not allow the user to easily move the system from one location of use to another. The quality of speech provided by the systems sited is also poor in order to keep costs down.

It is desirable, therefore, to have a low cost and more highly efficient method and device that can provide easily accessed, flexible and high quality computer generated speech to assist a therapist in training and motivating a verbally handicapped person of any age in the basics of speech and cognitive communications skills. Such a device and method would allow a verbally handicapped person to more easily and efficiently address impairments including voice jitter, speech rate, prosody, stress, accent, pronunciation, phonological performance, stuttering, auditory skills, and general articulation, as well as decision making and word/object associations. Such a device should be easily transported from one location to another to allow a therapist or a handicapped person to use the method and device in any convenient location in a home, school, hospital, clinical treatment centre or institution. Such a method and device would provide a therapist with a greater range of speech development exercises to assist in the clinical, diagnostic and educational development of speech skills for the verbally handicapped, as well as reduce the stressful demands normally placed on the therapist. The therapist would therefore be more alert, productive and have the time to concentrate on applying those therapy skills that require more personal contact. Likewise the variety of exercises available with such a device would maintain the attention and concentration level of a verbally handicapped person over a longer period of time, and reduce their mental stress as well. Such a device would provide the verbally handicapped person with easy access to speech therapy exercises at almost any time of the day, with or without the presence of a therapist. Conventional treatment requires that the therapist is always in control of the verbally handicapped person which is a problem for some patients. Such a device would allow the verbally handicapped person to be given control in exercising speech development exercises on their own. It would also allow the verbally handicapped person to develop verbal skills early so that they could more easily communicate within everyday society. The method and device would also provide wide access to a computerized speech development system by many verbally handicapped persons who otherwise would not have such access. Considering the wide range of easily accessible and high quality speech exercises that would be made available, such a device would also have applications for the early development of speech for children who do not necessarily have any particular verbal handicaps.

SUMMARY OF THE INVENTION

The principle object of the present invention is to provide an improved and more efficient method, and device for providing speech and cognitive skills development therapy, which produces high quality speech, has flexible speech development exercises, can be easily transported, and is inexpensive.

To this end there is provided a new and improved electronic device and computer system to allow speech therapists and verbally handicapped persons to interface to a central speech development computer system to provide verbal, visual and auditory feedback on aspects of speech and cognitive skills development. This interface can be effected from any location that has access to a standard telephone line.

The present invention uses a centrally located speech development computer system consisting of a standard commercially available high quality speech synthesizer connected to a personal computer. A speech development program runs on the personal computer and contains all of the exercises for speech development. Exercises range from basic skill building outside the context of languages, to full production of words and sentences in various languages. This program interacts with the speech synthesizer based on DTMF (Dual-Tone Multi-Frequency) commands sent over a standard telephone line from wherever a therapist and verbally handicapped person are using the present invention. The DTMF commands are generated by a "control unit" of the present invention and by a standard DTMF telephone. A therapist or verbally handicapped person initiates a call to the centralized computer system through the standard DTMF telephone. The central computer system answers the call allowing the therapist to setup the appropriate speech development exercises through the keypad of the DTMF telephone. The handicapped person then interacts with the exercises through control switches on the control unit of the present invention. The exercises use cause and effect to increase the verbally handicapped persons awareness of speech and cognitive skills. The control unit of the present invention and the standard DTMF telephone are connected to the same telephone port.

In accordance with the concept of keeping the invention inexpensive and usable wherever a standard DTMF telephone connection is available, the invention has been designed to allow a standard DTMF telephone to be used to dial up the computer, to setup and select exercises, and to exit the central computer system. In all cases the keypad of a DTMF telephone provides the additional feature of allowing a therapist to separately control all aspects of exercise selection. The keypad can also be used by the therapist to independently execute exercises to prompt a subject to interface with the control unit of the present invention.

The control unit of the present invention uses commonly available integrated circuits and other readily available electronic components in a manner that effects a low cost electronic interface that can be used by a handicapped person to communicate with a high cost and high quality speech development computer system over standard telephone lines. A feature of the invention includes the ability for the control unit device to be easily transported to any location that has a standard telephone interface. This provides the verbally handicapped person with the flexibility to use the invention at home or any other convenient location. Since the invention remotely interfaces to a speech development computer system, the verbally handicapped person is not burdened with moving a large computer and associated peripherals to the different locations where it is desired to use it. In addition, because the control unit of the present invention can access the centrally located speech development computer through a telephone line, it allows a very expensive speech development computer system to be used in a time partitioned manner by a number of verbally handicapped persons. This gives ready access by many users to a relatively expensive high quality speech development system. Considering the relatively low cost of the control unit of the present invention, the cost to any one user becomes very low.

A feature of the control unit of the present invention includes an electronic enclosure that has two large switch pads that allow the verbally handicapped person to execute exercises associated with speech development. These exercises include, but are not limited to exercises involving vowel and consonant verbal executions, building words using phonemes, decision processes using dual words and multiple words, number counting, letters of the alphabet, and item or feature identification. As the subject hits a switch pad a DTMF tone will be sent to the central computer system which will in turn respond with a computer generated voice depending on the exercise selected. The two switch pads are raised to facilitate easy location for those with visual or motor impairments. One switch pad has the soft half of VELCRO (TM) hook and loop type fastener material on its top surface while the other has the rough half of hook and loop type fastener material on its top surface to aid in providing further touch differentiation between the switch pads for those with visual impairments. A further feature of the invention are lights that are located centrally within each switch pad. Control signals from the central computer system optionally turn these lights on and off to prompt the user to hit the correct switch at the appropriate time. An additional level of optional prompting is also provided by a high and low pitch beeper to again identify which switch to hit. The therapist can activate the option prompts through switches located on the back panel of the invention control unit enclosure.

A further feature of the control unit of the present invention is the capability to externally interface to as many as sixteen inputs such as external "touch switches", and as many as sixteen outputs such as additional prompting lights. These external inputs and outputs are effected through an expansion port on the control unit and provide significant flexibility in providing more sophisticated and challenging speech development exercises.

The program of the central computer sends different voices over the telephone connection to the present invention depending on the exercise that is selected. One voice provides setup instructions, another prompts the subject for input, while a third voice represents that of the handicapped person. A feature of the control unit of the present invention is a built in audio control circuit with provisions to allow the synthesized voices for setup, prompting and the handicapped person to all be heard through the same built in speaker. Alternatively the system can be configured to allow the setup and prompting voices to be heard through the built in audio speaker, and the handicapped persons synthesized voice to be heard through separate audio headphones or through an external amplifier/speaker system. Providing voice separation as defined in this later configuration allows the handicapped person to more easily identify with their own synthesized voice resulting in accelerated speech development.

BRIEF DESCRIPTION OF THE DRAWINGS

In order that the manner in which the above advantages and features of the present invention are attained may be understood in detail, the following description of the preferred embodiment of the invention may be referred in conjunction with the accompanying drawings, which drawings form a part of this specification.

In the drawings.

DETAILED DESCRIPTION OF THE INVENTION

Figure 1:
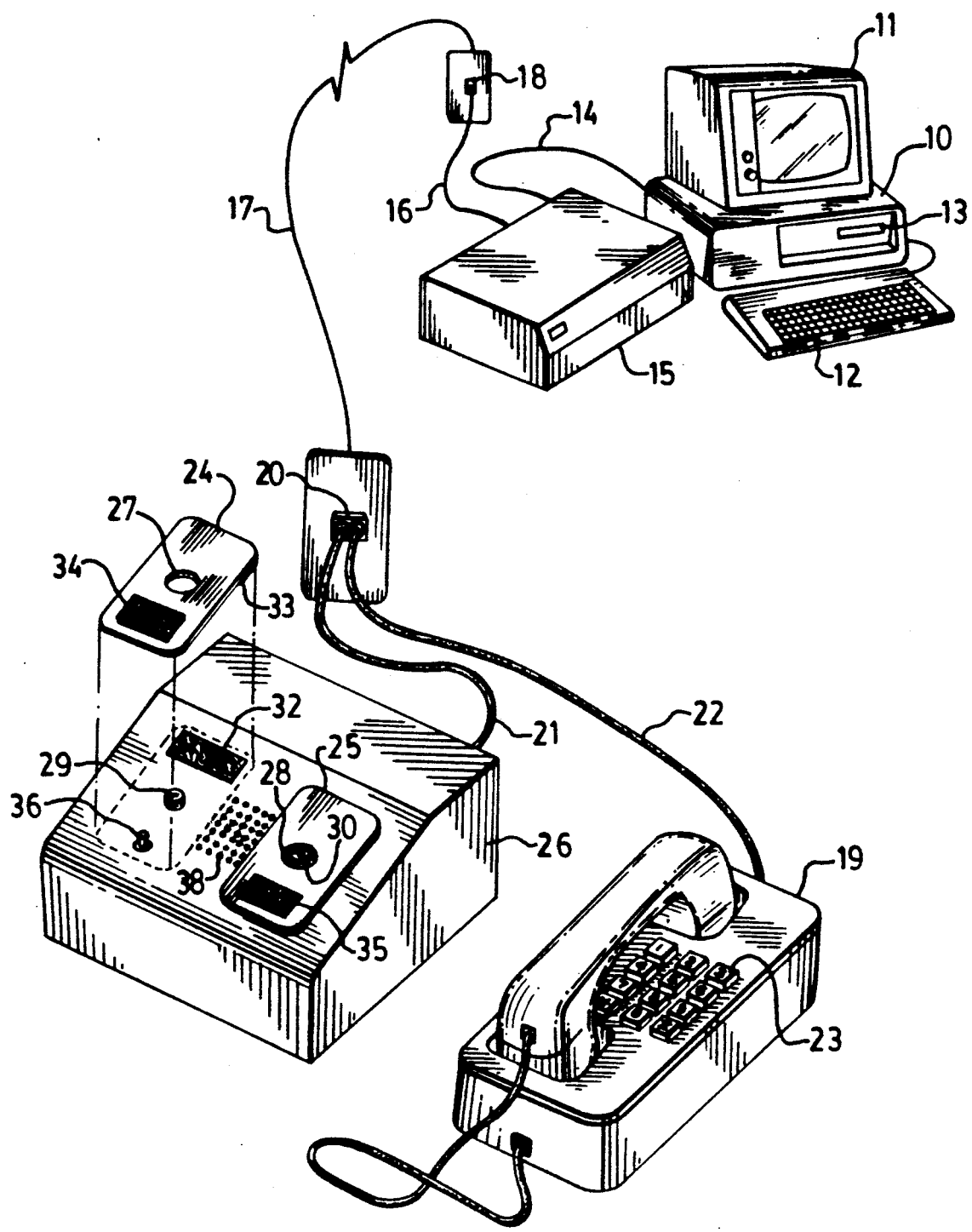
FIG. 1 is a pictorial view of the system components of the audio/telecommunications system to assist in speech and cognitive skills development for the verbally handicapped.

Referring now to FIG. 1, a system, including a method and a device, within which the present invention may be practiced in shown. A personal computer 10 such as an IBM-PC or AT is used to run a speech development software controlling program. This software program shall be referred to as the "speech development program". Typically this personal computer system would minimally consists of 256K RAM memory for program execution, and peripheral devices including a monitor 11, keyboard 12, and single floppy drive 13. The speech development program resides within the RAM memory of the personal computer and provides all master control functions for speech development once in the run mode. An asynchronous serial communications line 14 connects the personal computer 10 to a speech synthesizer 15. Through this serial communications line the speech development program can send messages to the speech synthesizer, such as a word to be spoken, and similarly the speech synthesizer can send messages to the personal computer, such as informing the speech development program when the synthesizer has completed speaking a particular word. In a preferred embodiment the speech synthesizer is a standard human speech synthesizer system with a built in telecommunications port for direct connection to a telephone line port. It can be programmed to produce high quality speech. Dectalk from Digital Equipment Corporation is one such commercially available speech synthesizer. Another embodiment of the present invention could have the synthesizer configured as a separate circuit board located in a backplane I/O slot of the personal computer 10, thus eliminating the need for the serial communications line 14. The speech synthesizer connects to a standard telephone jack 18 with a cable 16. Communications to the end user is effected through a standard public telephone network 17 which makes connections to the control unit 26 and standard DTMF telephone 19 through a standard telephone jack 20 and cables 21 and 22.

For purposes of description clarity the personal computer 10, personal computer peripheral devices 11, 12, and 13, the speech synthesizer 15 and their serial interconnection 14, as well as the speech development software program, shall be referred to as the "central computer system".

In order to ready the central computer system for communications, the personal computer system and speech synthesizer are powered up, and the speech development program is put into run mode on the personal computer. Once in the run mode the program will command the speech synthesizer to go into a call waiting mode, in which the speech synthesizer will wait for the ring detection signal from an incoming call. The system will remain in this static mode until an incoming call is received.

To initiate a call to the central computer system the therapist would enter the appropriate phone number using telephone 19. This call can be initiated using pulse dialing, however once the call in answered by the central computer system the telephone must be put into tone or DTMF dialing mode to allow interaction with the speech development program. Once the speech synthesizer 15 detects an incoming call it will answer the call by putting the incoming line into an off-hook status. The synthesizer will then send a message to the personal computer's speech development program that identifies that a call to the central computer system has been received. This will cause the speech development program to send a string of words to the speech synthesizer such as—"Hello. Welcome to the speech development system. Please select an exercise.". These words will be vocalized by the synthesizer and sent over the telephone network to the therapist's DTMF telephone 19. This tells the therapist that the central computer system is ready for DTMF telephone data entries in order to setup and select particular speech development exercises.

DTMF telephone buttons (0) through (9) on the DTMF telephone keypad 23 are used to setup and select speech development exercises. In one embodiment of the speech development program, keypad button (#) is used to exit a selected exercise at any time, keypad button (*) is used to terminate the calling session at any time, and two digit DTMF keypad inputs are used to select exercise and setup menus. Typical manually prompted or automatically prompted exercises that are accessed through a two digit DTMF code include but are not limited to dual word exercises (i.e. yes and no), multiple word exercises (i.e. days of the week), vowel exercises, combination vowel and consonant phonetic exercises, alphabet exercises, counting exercises, reading exercises, and music exercises. As the therapist enters two digit keypad numbers that correspond to a code for a particular exercise, the synthesizer interprets the DTMF tones that are sent by the telephone and communicates the corresponding numerical digits or characters to the personal computer speech development program. The program will interpret the numbers received and will then initiate the appropriate exercise or setup menu. The program will further prompt the therapist for secondary exercise DTMF key entries until an exercise has been started, at which time the handicapped person would communicate with the central computer system by depressing switch pads 24 or 25 on the control unit 26. The therapist can also access setup parameters to define a number of exercise variables including the name of the verbally handicapped person, the name of the therapist, the instruction voice, the subject's voice, and aspects of speech production including pitch, timing, intonation, speech rate, and vowel duration. All setup parameters are automatically accessed when the therapist calls the system and enters an appropriate access code, and all changes to the setup parameters are stored when the therapist exits the program. Considerable flexibility is provided to the therapist to also customize exercises depending on the needs of the verbally handicapped person. If the central computer system does not receive any responses over the telephone line after a programmed period of time, it will automatically hang-up the phone line to allow access to the system by others.

Control unit 26 is a unique device of the present invention that contains an electronic circuit board that provides the interactive interface between the verbally handicapped person and the central computer system through a public telephone network 17. The control unit connects to the telephone network through a cable 21 which connects to the same telephone jack 20 as cable 22. Switch pads 24 and 25 each contain a centralized hole 27 and 28 through which lights 29 and 30 can be seen. As a handicapped person interacts with certain speech development program exercises, lights 29 or 30 will turn on automatically, under the control of DTMF signals from the central computer system, to prompt the subject as to which switch pad should be hit. Both switch pads have a large (approximately 2.5"×4.5") surface area. This large surface area provides a sufficiently large target area for a handicapped person with poor motor skills to hit the switch pads. VELCRO(TM), hook and loop type material is used to attach the top edge of each switch pad to the top surface of the control unit. For switch pad 24, one half of the hook and loop type fastener material 32 is located on the top surface of the control unit and the other half 33 is located on the underside surface of the switch pad. Hook and loop type fastener material is used to similarly attach switch pad 25 to the top surface of the control unit. This method of switch pad attachment allows the switch pads to flex when hit which prevents breakage, and also allows the switch pads to be easily removed for cleaning purposes or to attach personalized switch pads. The switch pads 24 and 25 sit above the top surface of the control unit enclosure to allow a person with visual impairments to more easily find the switch pads. A small piece of opposing halves of hook and loop type fastener material 34 and 35 is also attached to a localized area on the top surface of each switch pad to assist a visually impaired person in discriminating between the two switch pads. In this preferred embodiment, one switch pad has the softer half of hook and loop type fastener material 34 attached to it and the other has the rougher side of hook and loop type fastener material 35 attached to it. The small pieces of hook and loop type fastener material on the top surface of each switch pad can also be used to attach objects to the switch pads. Attaching objects to the switch pads allows voice reproductions to be reinforced through the association with attached physical objects. For example if one switch pad causes the word "ball" to be sounded when hit, then a ball could be physically attached to the switch pad, using hook and loop type fastener material to reinforce the word association. A normally opened push-to-close switch 36 is mounted through the top surface of the control unit enclosure and under the lower end of the left switch pad. A normally opened push-to-close switch 37 is similarly mounted under the right switch pad. As the handicapped person hits a switch pad it forces the normally opened switch to close, and in turn causes the electronic circuit of the control unit to send an appropriate DTMF signal over the telephone line to the central computer system. In this way the central computer system knows which switch pad is hit by the handicapped person and can make an appropriate response depending on which exercise is active. The central computer system responses are vocalized through speaker 38.

Figure 2:
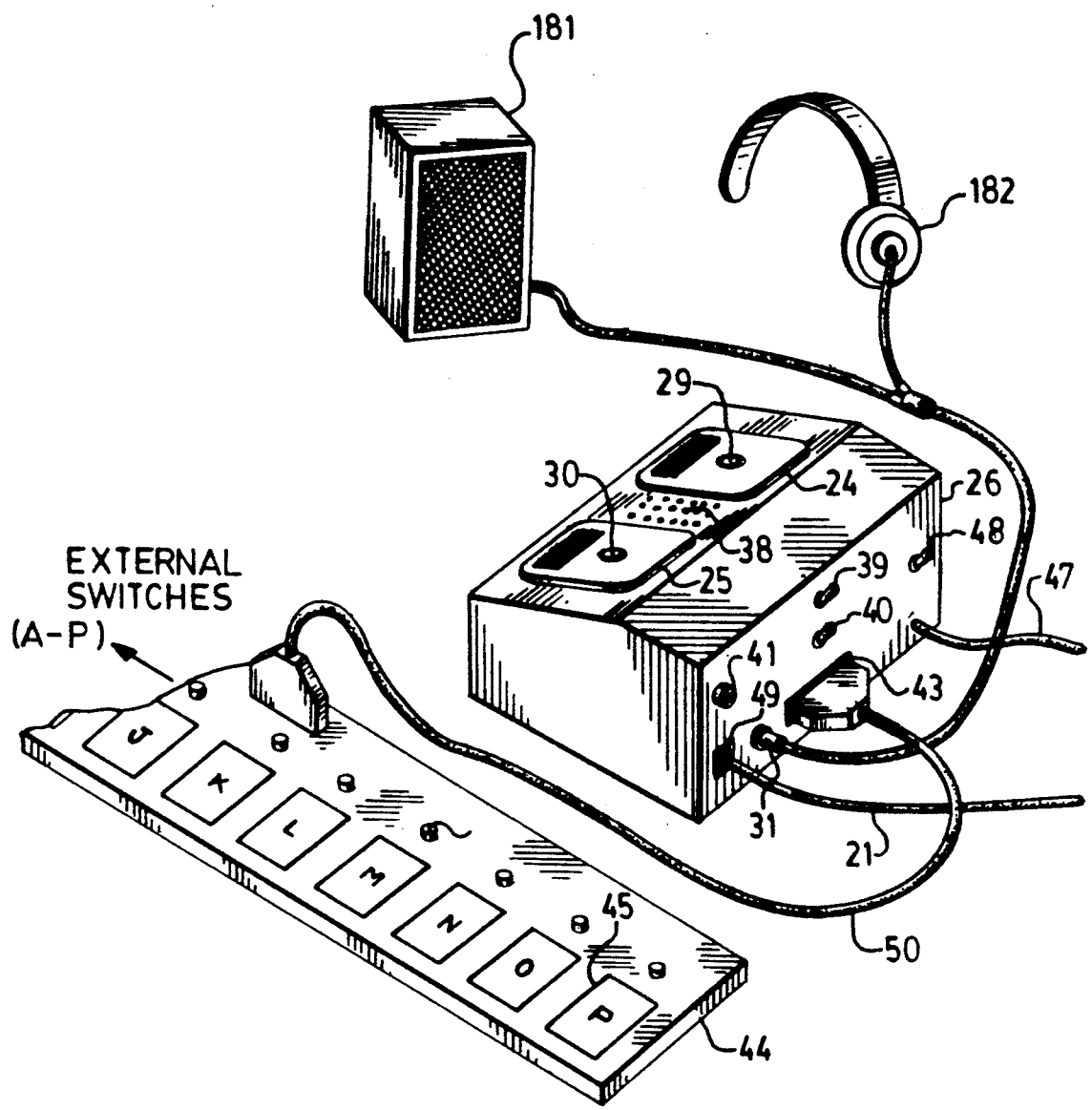
FIG. 2 is a more detailed pictorial view of the control unit that is used by the handicapped person as part of the system in FIG. 1

The back panel of the control unit electronic enclosure is shown in FIG. 2. The back panel has a number of controls and interfaces that allow the therapist further flexibility in exercise control and functionality. The switches 39 and 40 are toggle switches that allow the therapist to control the activation of the previously mentioned switch pad lights 29 and 30, as well as to control a two tone beeper. The two tone beeper is used as a method of further prompting the subject as to which switch to hit. A low tone corresponds to the left switch pad 24 and a high tone corresponds to the right switch pad 25. An audio volume control 41 on the back panel allows the therapist to control the volume of the computer generated voice that is sounded through the internal audio speaker 38. An audio output jack 31 is provided to allow the computer generated voice, corresponding to the handicapped person's voice, to be separately sent to a set of audio headphones, or external audio system. A connector port 43 is provided to allow the external expansion of single point input and output interfaces (i.e. input switches and output lights) through cable 50. Up to sixteen switch inputs (A-P) can be added through the use of an external switch board 44 that contains individual "touch sensitive" switch pads 45 that use conductive touch switches, proximity switches, capacitive switches, mechanical switches or other methods of closing a normally open logical input to signal a response by the handicapped person. In addition to sensing the logical state of inputs, the connector port also has provisions for controlling up to sixteen outputs, such as lights 46 or other electrically controlled devices that can be used as prompts for various voice exercises.

Power to the control unit is provided through a power cord 47 and an on-off switch 48. A standard telephone jack 49 provides an interface to the public telephone network.

Figure 3A:
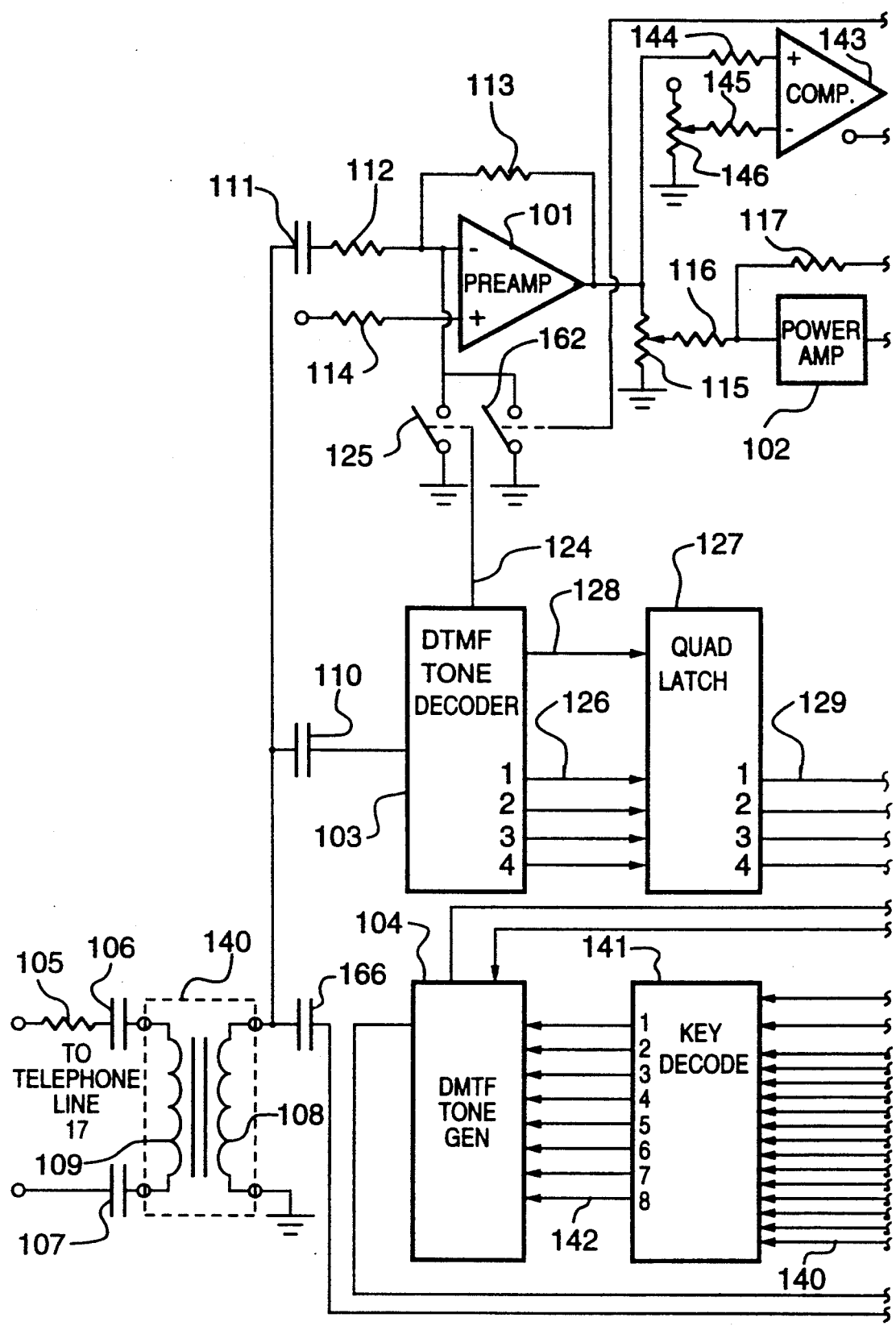
FIG. 3 is an electronic circuit block diagram of the control unit that is used by the handicapped person as part of the system in FIG. 1 and shown in FIG. 3A and FIG. 3B.
Figure 3B:
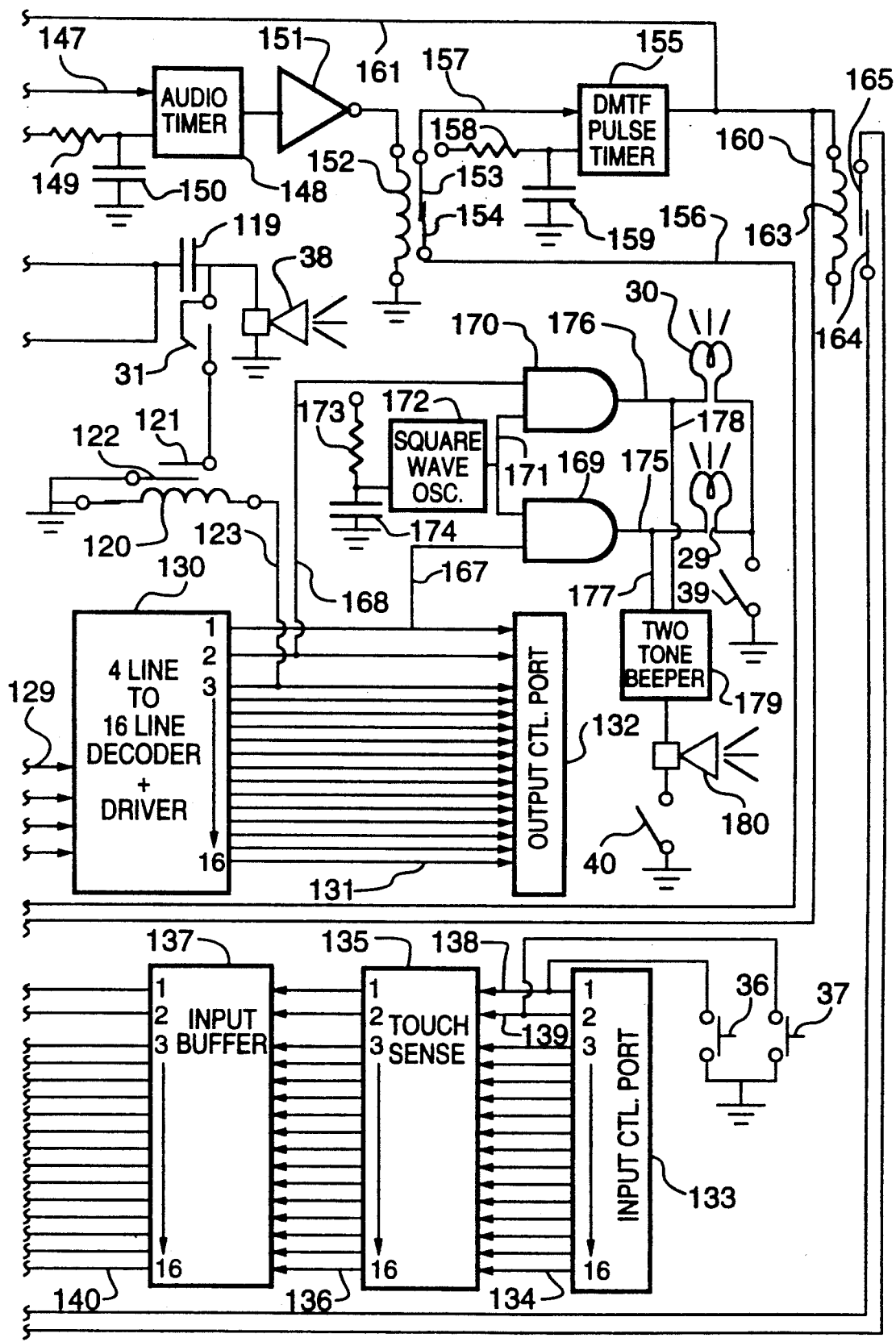

The functionality of the electronic circuit of the control unit is shown in the block diagram of FIG. 3. The primary functions of the electronic circuit are telephone interface primarily through a telephone coupling transformer 100, audio output control and amplification primarily through preamplifier 101 and power amplifier 102, DTMF tone decoding primarily through a DTMF tone decoder 103, and DTMF tone generation primarily through a DTMF tone generator 104. Other circuitry serves to provide input and output interface control and sequencing control between the said electronic circuit primary functions.

The telephone interface is typically effected through a resistor 105 for impedance matching and capacitors 106 and 107 for d.c. isolation. A 1:1 telephone coupling transformer 100 provides further impedance matching to the telephone network 17, as well as isolation, and allows the audio signals to be bi-directionally coupled from the telephone network to the control unit electronic circuit. It is through this telephone interface that control signals and speech are communicated from the central computer system to the control unit and that control signals are communicated from the control unit to the central computer system. The audio signal from the telephone network 17 is coupled from coil 109 to coil 108, and through d.c. isolation capacitors 110 and 111 is further applied to the DTMF tone decoder circuit and to the audio output circuit.

From the d.c. isolation capacitor 111 the audio output circuit receives its signal through a resistor 112 which sets the signal level applied to the input of operational amplifier 101. The combination of resistor 112 and a feedback resistor 113 controls the gain of this preamplifier circuit. The combination of resistors 114 and 113 sets the d.c. level of the preamplifier output. The output of the preamplifier is applied to a variable resistor 115 that is set externally by the therapist through volume control knob 41 to control the overall audio volume. The signal from this variable resistor is applied to a power amplifier 102 through resistor 116. One commonly available single supply power amplifier that could be used in this application is an MC34119 from Motorola. The gain of this power amplifier is controlled through the combination of resistors 116 and feedback resistor 117. The output of the power amplifier is coupled to an audio speaker 38 through a d.c. isolation capacitor 119. The audio output is also made available to an external audio speaker 181 or audio headphones 182 through an audio jack 31. This output is enabled through the activation of reed relay 120 which closes contacts 121 and 122. The reed relay is activated when the DTMF tone decoder 103 receives a DTMF control tone from the central computer that causes control line 123 to go to a high logic level.

The audio signal from the telephone network 17 is also coupled to a DTMF tone decoder 103 through a d.c. isolation capacitor 110. One commonly available tone decoder integrated circuit that could be used in this application is an MC145436 from Motorola. The DTMF tone decoder detects the presence of one of sixteen DTMF tones. After a DTMF tone is received over the telephone line and detected by the DTMF tone decoder, the tone decoder sends a control signal over line 124 to an electronic switch 125 to disable the audio signal input to the preamplifier 101. Disabling the audio signal input to the preamplifier, after a short delay for tone detection, reduces the audio level and duration in which a DTMF control tone is heard through audio speaker 38. The subject will still hear a short control DTMF tone which serves the purpose of providing a prompt to assist in decision making. At the same time that a DTMF tone is detected by the tone decoder, the binary digit representation of the tone is applied to the four output digital data lines 126 of the tone decoder. These lines connect to the input of a four bit binary latch 127 which latches the logical state of the input data lines 126. The latching of the four input lines occurs when the tone decoder 103 sends a high to low logical transition to the latch over line 128. This control transition occurs shortly after the detection of a tone and causes the four bit binary representation of the DTMF code to be latched to the four output lines 129. A four-line-to-sixteen-line decoder/driver 130 decodes the four binary coded inputs 129 into one of sixteen outputs 131. These outputs are connected to an output port 132 as part of connector port 43 to allow the external control of devices for various speech development exercises. The four-line-to-sixteen-line decoder/driver sets the appropriate active output line to a high logical level, and all other output lines to a low logical level as a particular DTMF control code is received and decoded.

Inputs to the DTMF tone generator 104 are affected through external inputs connected to an input port 133 as part of connection port 43, or through the normally opened push buttons 36 and 37. One commonly available tone decoder integrated circuit that could be used in this application is an S25089 from Texas Instruments. External inputs are controlled by "touch sensitive" switches such as proximity switches, capacitive switches, mechanical switches or other methods of closing a normally open logical contact. Sixteen external switch inputs 134 are provided through the input port 133 which connects to a touch sense and buffer control electronic circuit block 135. This control block detects the presence of a switch closure which provides a logical high output transistion through sixteen lines 136 to an input buffer 137. The input buffer provides signal hysteresis to ensure full input switch closure before accepting a switch transition. Also connected to the touch sense circuit block are the two normally opened push-to-close switches 36 and 37 that are mounted on the top surfaces of the control unit enclosure. One of these switches is appropriately closed when the handicapped person hits a switch pad 24 or 25 on the control unit 26. These two switches are connected to switch lines 138 and 139. The sixteen output lines 140 of the input buffer connect to a key decoder electronic circuit block 141 which applies appropriate logical control signals to the DTMF tone generator 104 through eight control lines 142. The DTMF tone generator generates one of sixteen standard DTMF tones which identify which of the sixteen input switches is closed.

The appropriate DTMF tone is generated by the DTMF tone generator 104 immediately upon input switch closure, however several logical conditions must be met before the DTMF signal is sent to the telephone network 17. These logical conditions prevent a DTMF tone from being sent by the DTMF tone generator if an audio signal is already present on the telephone network. This prevents the handicapped person from simultaneously sending a DTMF tone signal to the central computer system if the central computer system is already in the process of sending a voice command to the subject. This in turn ensures that the subject thoroughly listens to all voice commands or prompts before being allowed to take an action. This condition of only allowing a DTMF signal to only be sent by the DTMF tone generator in the absence of a voice is effected through an audio detection circuit. The circuit takes the audio signal output from the preamplifier 101 and firstly applies it to a comparator 143 through resistor 144. The audio detection threshold level of the comparator is set through the combination of resistors 144, 145, and variable resistor 146. When an audio signal of a set threshold level is detected by the comparator the output of the comparator goes to a logical high state. Through data line 147 this sets the output of audio timer 148 to a logical high state. The timer will remain in a logical high state as long as the audio signal remains above the detection threshold level of the comparator. When the audio signal is no longer detected by the comparator the output of the comparator will go to a logical low state, and the timer will transition from a logical high state to a logical low state after a short time delay depending on the values of timing resistor 149 and capacitor 150. This time delay ensures that the output of the audio timer will remain in a high logical state during short pauses between audio signals that represent synthesized words or sentences sent by the central computer system. The logical control signal from the audio timer passes its logical state through an inverter driver 151 to a normally open reed relay 152. When the logical state of the audio timer output is low, meaning no audio signals are present on the telephone network, the read relay becomes active which closes contacts 153 and 154. This allows an input switch closure detection control signal from the DTMF tone generator 104 to be applied to the input of the DTMF pulse timer 155 through lines 156 and 157. If an input switch, 36 or 37 for example, is closed and no audio signal is present on the telephone line, then the tone generator 104 sends a logical low to high transition over control line 156 immediately upon switch closure which causes the output of the DTMF pulse timer 155 to go to a logical high state. The duration of this logical high state is set by resistor 158 and capacitor 159. This logical high output state is sent back to the tone generator over control line 160 to enable the tone generator to send out a DTMF tone and also through line 161 which causes an electronic switch 162 to close disabling the input to preamplifier 101. The high output state of the DTMF pulse timer 155 also energizes a reed relay 163 causing contacts 164 and 165 to close. The closure of these contacts causes the DTMF tone from the tone generator to be applied, through a d.c. isolation capacitor 166, to coil 108 of the isolation transformer 100. The physical contacts of reed relay 163 provide a.c. isolation between the output of the tone generator and the telephone network. The DTMF signal from the tone generator is in turn applied to the telephone line 17 through the impedance matching and isolation network consisting of the isolation transformer 100, capacitors 106 and 107, and resistor 105.

For some speech development program exercises lights 29 and 30 are used to prompt the handicapped person as to which switch pad on the control unit to hit. One of these lights automatically turns on when the speech development program sends an appropriate DTMF signal over the telephone line which is received and decoded by the DTMF tone decoder 103. The decoded four bit binary value from the tone decoder is latched and causes the appropriate bit of the four-line-to-sixteen-line decoder/driver to be pulled to a logical high state. This turns on the appropriate light. In the configuration shown in FIG. 3 one light is activated when the speech development program sends the DTMF tone corresponding to the keypad digit (1) and the other is activated when keypad digit (2) is sent. Control lines 167 and 168 are one of two inputs to AND gates 169 and 170 respectively. The output control line 171 of square wave oscillator 172 is the other common input to each of the AND gates. The output frequency of this square wave oscillator is controlled by resistor 173 and capacitor 174. During the positive half cycles of the square wave oscillator the output lines 175 and 176 of an AND gate will transition to a logical high level if the other AND gate input line, 167 or 168, is also at a logical high level. Therefore as lines 167 or 168 are set to a high logic level the corresponding AND gate output will transition between high and low logic levels according to the frequency of the square wave oscillator. As the output lines 175 or 176 transition between low and high logic levels it causes its corresponding light 29 or 30 to flash on and off. The two AND gate outputs are also connected to a two tone beeper 179 through control lines 177 and 178. When control line 177 is at a high logic level it causes the two tone beeper to sound with a low frequency and when control line 178 is at a high logic level it causes the beeper to sound with a high frequency. An audio speaker 180 connected to the output of the two tone beeper presents the high or low frequency sound. Opening switch 39 disables the automatic flashing of lights 29 and 30. Opening switch 40 disables the sounding of the two tone frequency.

While a preferred embodiment of the invention has been shown and described, it will be appreciated by those skilled in the art that variations and modifications may be made to this embodiment without departing from the principles and true spirit of the present invention, the scope of which is defined in the appended claims.

What is claimed is:

1. An interface electronic circuit control unit system for use by a human user to establish bidirectional telephonic communications with a remote central computer system with a speech synthesizer running an interactive software program for applications for speech and cognitive skills development, comprising bi-directional telephone interface circuit means for receiving incoming dual-tone multi-frequency (DTMF) control signals and synthesized voicing from a standard telephone network as well as allowing dual-tone multi-frequency control signals to be transmitted from said interface electronic circuit to said telephone network, pre-amplifier and power amplifier circuit means with an input operatively connected to said bi-directional telephone interface circuit for receiving said dual-tone multi-frequency control signals and synthesized voicing from said central computer system, amplifying said dual-tone multi-frequency control signals and synthesized voicing into amplified dual-tone multi-frequency control signals and synthesized voicing and applying said amplified dual-tone multi-frequency signals and synthesized voicing to an audio speaker and an audio output jack, dual-tone multi-frequency tone decoding circuit means with an input operatively connected to said bi-directional telephone interface circuit for receiving and decoding said dual-tone multi-frequency control signals from said central computer system into decoded dual-tone multi-frequency control signals, latching said decoded dual-tone multi-frequency control signals into a binary code, and decoding said binary code into a single bit for output prompting control, dual-tone multi-frequency tone generating circuit means with an output operatively connected to said bi-directional telephone interface circuit for generating dual-tone multi-frequency tones from touch sense switch inputs, buffering said touch sense switch inputs and decoding said touch sense switch inputs into dual-tone multi-frequency control tones that are sent to said central computer system, audio threshold level detection circuit means with an input operatively connected to said pre-amplifier circuit for detecting the presence of a said dual-tone multi-frequency control signal or synthesized voicing from said central computer system, as amplified by said pre-amplifier means, and an output operatively connected to said dual-tone multi-frequency tone generating circuit for inhibiting the output of dual-tone multi-frequency tones from said dual-tone multi-frequency tone generating circuit upon audio detection, indicating means consisting of flashing lights or beepers operatively connected to an output of said dual-tone multi-frequency tone decoding circuit for prompting said human user.

2. The control unit system as described in claim 1, wherein said bidirectional telephone interface means comprise an impedance matching and isolation transformer with one coil connected to said telephone network and the other coil connected to the input of said pre-amplifier circuit, to the input of said dual-tone multi-frequency tone decoding circuit and to the output of said dual-tone multi-frequency tone generating circuit, a resistor and capacitor network for impedance matching and d.c. isolation between said one coil of the transformer and the telephone network, and a capacitor network for d.c. isolation between the other coil of said transformer to the input of said pre-amplifier circuit and said dual-tone multi-frequency tone decoding circuit, and the output of said dual-tone multi-frequency tone generating circuit.

3. The control unit system as described in claim 1, wherein said pre-amplifier and power amplifier circuit means comprise a pre-amplifier with an input connected to said bi-directional telephone interface circuit and a pre-amplified output connected to an input of a power amplifier and to the input of said audio threshold level detection means, a pre-amplifier resistor network for setting the gain of said pre-amplifier, a dual electronic switch network connected to the input of said pre-amplifier with one electronic switch controlled by the output of said audio threshold level detection circuit in combination with an input switch closure control signal from said dual-tone multi-frequency tone generating circuit, and the other electronic switch controlled by a tone detection control signal from the output of said dual-tone multi-frequency tone decoding circuit, said power amplifier with an input connected to said pre-amplifier output and with a power amplified output connected to the audio speaker and audio output jack, and a power amplifier resistor network to control the gain and said power amplifier amplified the output of said power amplifier.

4. The control unit system as described in claim 3, wherein said dual-tone multi-frequency tone decoding circuit means comprise a dual-tone multi-frequency tone decoder with an input connected to said bi-directional telephone interface circuit, a four bit binary output connected to the input of a four bit binary latch, a single output control line connected to the input of said latch to strobe said four bit binary output for latching and a single output control line connected to one input of said dual electronic switch network to control said pre-amplified output passed by said pre-amplifier, said four bit binary latch with the input received and strobed by said dual-tone multi-frequency tone decoder, and with said four bit binary output connected to the input of a 4-line-to-16-line decoder/driver, and said 4-line-to-16-line decoder/driver with the input received from said latch and with sixteen outputs made available to a connector for external prompting or indicating control, two outputs connected to AND gates to control the indicating means, and one output connected to a driver to control a relay that allows an audio output to be switched to an external port under the control of said central computer system.

5. The control unit system as described in claim 1, wherein said dual-ton multi-frequency tone generating circuit means comprise a touch sense circuit with normally opened inputs which can be externally connected to up to sixteen touch sense switches or normally open switches through a connector and is internally connected to two normally opened switches that are controlled by external switch pads, and with sixteen touch sense circuit outputs connected to an input buffer, said input buffer that provides input hysteresis and buffering to said sixteen touch sense circuit outputs from said touch sense circuit, and with sixteen buffered outputs connected to a key decoder, said key decoder that decodes said sixteen buffered outputs from said input buffer and applies digital control signals to a dual-tone multi-frequency tone generator, said dual-tone multi-frequency tone generator that generates one of sixteen dual-tone multi-frequency tones depending on the digital control signals received from said key decoder, sends a signal to a dual-tone multi-frequency pulse duration timer that is set when one of said sixteen touch sense switches or said normally open switches is closed and when said audio threshold level detection means does not detect an audio signal, and outputs a dual-tone multi-frequency tone to said bi-directional telephone interface circuit through the contracts of a relay that is controlled by said dual-tone multi-frequency pulse duration timer, said dual-tone multi-frequency pulse duration timer that controls the duration of a dual-tone multi-frequency pulse as applied to said bi-directional telephone interface circuit, and a resistor and capacitor network connected to the said dual-tone multi-frequency pulse duration timer for controlling the duration of said dual-tone multi-frequency pulse.

6. The control unit system as described in claim 1, wherein said audio threshold level detection circuit means comprises a comparator with an input received from said pre-amplifier and with an output transitioned to a high logic level once an pre-amplified output from said pre-amplifier reaches a set audio threshold level, a resistor network that sets biasing and said audio threshold level for said comparator, an audio detection delay off timer with a timer output which is set to the high logic level when said comparator detects said pre-amplified output from said pre-amplifier and with said timer output remaining in the high logical state for as long as said comparator detects said pre-amplifier output and for a short setable time delay thereafter, a resistor and capacitor network that sets the time for which the timer output of said audio detection delay off timer will remain at the high logic level after said pre-amplifier output is no longer detected, and an inverter driver and reed relay that closes a set of contacts when the timer output of said audio detection delay off timer is at a low logic level, allowing said dual-tone multi-frequency tone generating circuit to send a dual-tone multi-frequency tone to said bi-directional telephone interface circuit.

7. The control unit system as described in claim 1, wherein said indicating means is provided for prompting and comprise a square wave oscillator with frequency set by a resistor and capacitor network, two AND gates with each receiving a different signal input from a 4-line-to-16-line decoder/driver and with a second common input received from said square wave oscillator, producing an output signal that causes lights to flash under the control of a dual-tone multi-frequency signal sent by said central computer system and enabled by a switch, and a two tone beeper that receives its input from the said two AND gates with output connected to an audio speaker and enabled by a switch.

8. A method for allowing a human user to interact with a control unit to access a remote central computer system with a speech synthesizer running an interactive software program for applications for speech and cognitive skills development through a standard telephone communications network comprising the steps of:

receiving dual-tone multi-frequency control signals, audio messages and voicing through said control unit from said remote central computer system consisting of said speech synthesizer with a telephone interface under the control of an application program residing on a personal computer, transmitting dual-tone multi-frequency control signals from said control unit to said remote central computer system to identify responses by said human user and to setup application exercises using a standard dual-tone multi-frequency telephone, controlling of a dual output audio system by said control unit that allows said human user to hear audio instructions from one audio speaker and personalized voice responses through a separate audio speaker, activating said control unit indicating means consisting of one of two flashing prompting lights under program control to prompt the appropriate action to be taken by said human user, and sounding an indicating means consisting of one of two pulsating prompting beepers that correspond to the appropriate action to be taken by said human user, and interfacing through said control unit expansion port, to up to sixteen inputs and outputs for increased application program capability and flexibility.

9. The interface electronic circuit control units as defined in claim 1, further including an apparatus that consists of an enclosure for said interface electronic circuit control unit and having two raised switch pads that are attached to said enclosure by a hinge consisting of VELCRO (TM) hook and loop type fastener material that is located at a top edge of each of said switch pads, with an indicating light located centrally within each of said switch pads for prompting and additional opposing halves of hook and loop type fastener material located on a top surface of each switch pad for switch pad differentiation through feel.

10. A method as defined in claim 8 whereby the said audio speaker that sounds the personalized voice responses is an audio headphone.

* * * * *